June 25, 1935.  C. A. UPSON  2,006,232
VEHICLE INSULATION
Filed Oct. 2, 1931
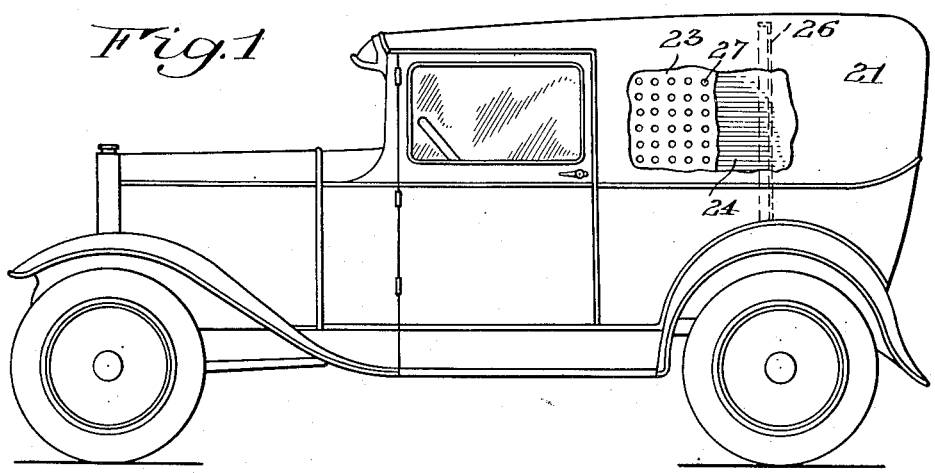
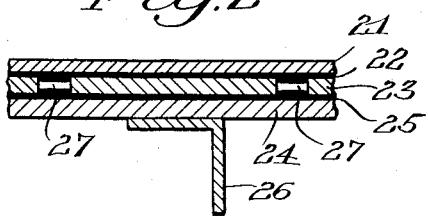
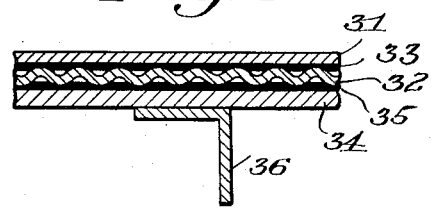
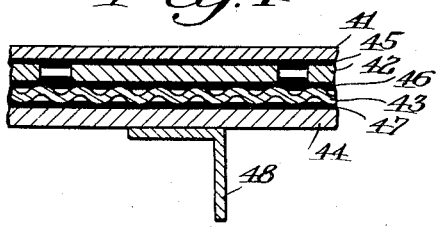
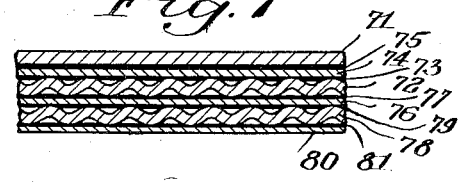
INVENTOR
Charles A. Upson
BY Edward H. Cumpston
his ATTORNEY Patented June 25, 1935

2,006,232

UNITED STATES PATENT OFFICE 2,006,232

VEHICLE INSULATION

Charles A. Upson, Lockport, N. Y., assignor to The Upson Company, Lockport, N. Y., a corporation of New York Application October 2, 1931, Serial No. 566,528

8 Claims. (Cl. 154—44)

This invention relates to vehicle insulation and to the construction of vehicle bodies. It is applicable to various kinds or types of vehicles, including automobiles, aeroplanes, and motor boats.

An object of the invention is to provide a simple, satisfactory, and inexpensive vehicle body construction in which body noises and other sounds are eliminated or substantially reduced and which also will insulate the body to some extent against passage of heat or cold therethrough.

Another object of the invention is the provision of simple, economical, and efficient insulation for the above purposes, which can be produced cheaply, shipped readily, and applied quickly to the vehicle body.

A further object is the provision of insulation so designed and constructed that when it is incorporated in a vehicle body, the inner surface of the insulation itself may be used as the exposed or finished interior surface of the body.

To these and other ends the invention resides in certain improvements and combinations of parts, all as will be hereinafter more fully described, the novel features being pointed out in the claims at the end of the specification.

In the drawing:

Fig. 1 is a side elevation of an automobile body constructed in accordance with one embodiment of the present invention;

Fig. 2 is a fragmentary diagrammatic section through a portion of the automobile body illustrated in Fig. 1, showing one embodiment of the invention;

Fig. 3 is a similar view illustrating a second embodiment of the invention;

Fig. 4 is a similar view illustrating still another embodiment of the invention;

Fig. 5 is a similar section illustrating a slightly different embodiment of the invention;

Fig. 6 is a similar view showing a fifth embodiment, and

Fig. 7 is a similar view showing a still further possible embodiment of the present invention.

Similar reference numerals throughout the several views indicate the same parts.

According to the present invention, a layer of non-metallic insulating material is applied to the inner surface of the main body sheet or layer of the vehicle body, which is usually of sheet metal. This non-metallic insulating material is preferably applied to the whole or a substantial part of the area of the inner surface of the body sheet.

The insulating material used according to the present invention is preferably a fibrous material and at least a part of it is preferably of relatively soft fibrous material rather than being hard or rigid, so that it may better absorb sound waves and reduce noise and vibration. Preferably the fibrous material is formed of cellulosic fibres, such as paper fibres or the like, and it is usually desired to have the insulating material sufficiently strong so that it forms a self-supporting sheet and may be applied in the form of a sheet or layer.

Although various materials might be employed, the one which is preferred according to the present invention is embossed paper. Preferably a relatively thick and relatively soft paper or felt paper sheet is embossed so that it has a series of projections on one or both sides at relatively close intervals. Such paper may also be said to have a series of non-perforating cavities on one or both sides, or to be embossed so as to be deformed out of its original plane at relatively close intervals, so that the effective thickness of the sheet is substantially increased without increasing its mass, thus providing a better and more effective insulation.

Referring now to the drawing, and particularly to Fig. 6 thereof, there is shown in diagrammatic cross section one embodiment of the invention, comprising an outer body layer 61 which may be and usually is of sheet metal, and a layer 62 of embossed paper, preferably formed from a relatively thick and soft sheet, as above set forth. Interposed between the layers 61 and 62 is a layer 63 of adhesive for affixing them to each other, which adhesive is preferably of a tacky character such as asphaltum.

The layer 62, when applied to a substantial area of the sheet metal 61 and when securely affixed thereto by adhesive, is found to reduce materially the noise and vibration which commonly occur in sheet metal vehicle bodies, especially the noises occurring in an automobile body when the automobile is travelling at high speed or over rough roads. Not only is the sound materially damped by this construction, but furthermore it provides to some extent an insulation against the passage of heat or cold through the body, so that the body will be cooler in summer and warmer in winter than if not thus insulated.

In some instances, it may be desired to employ a more efficient and effective insulation than that which can be obtained from a single layer of embossed paper as above described. In that case, a layer 64 of plain or unembossed paper or fabric may be applied to the inner surface of the layer 62 by means of another layer of adhesive 65, likewise preferably of a tacky character such as asphaltum, and a second layer 66 of embossed paper, similar to the layer 62, may be secured to the paper 64 by a layer 67 of suitable adhesive such as asphaltum. By this construction, the sound waves are more effectively damped and the body is more thoroughly insulated both against noise and against heat and cold.

In some cases, whether one or more layers of embossed paper are employed, it may be desired to strengthen the insulating material so that it will withstand rougher handling and will remain better in place. This may be accomplished by associating with the insulating material a reinforcing layer of textile fabric or the like, preferably in the form of netting of rather open or coarse weave. Such a layer of netting is shown in Fig. 5, in which 51 is the main body sheet, usually of metal, 52 is a sheet of embossed paper, 53 the adhesive affixing the layers 51 and 52 to each other, and 54 the layer of reinforcing netting affixed to the sheet 52 by a layer 55 of adhesive. Here, as in all of the other embodiments of the invention, the adhesive employed is preferably of a tacky character such as asphaltum.

In case it is desired to provide the insulating material with a surface which may form the exposed or finished interior surface of the vehicle body, this may be done in some instances by providing a surface layer 56 of suitable finishing material such as paper, fabric, leather, or the like affixed to the adjacent layer by suitable adhesive. In case the adjacent layer is of netting such as the layer 54 in Fig. 5, the adhesive 55 would normally extend through the interstices of the netting and would serve also as the layer of adhesive for holding the finishing layer 56. In some classes of vehicle, such as in automobile truck bodies, for example, the layer of paper 56 may form the exposed or finished interior surface of the body, without further interior upholstering, and it may be suitably painted or otherwise decorated either before or after the layer 56 is placed in its final position.

While the reinforcing netting 54 is shown by way of example in Fig. 5, it is to be understood that it may be applied also to the multiple ply insulation illustrated in Fig. 6 or to any of the other embodiments of insulation illustrated in any of the other figures. The reinforcing layer has been omitted from the other figures of the drawing in order to simplify the drawing as much as possible, since the inclusion of the netting in Fig. 5 will clearly indicate to those skilled in the art the purposes and functions of the reinforcing layer and will be sufficient to enable such persons to utilize such a reinforcing layer in any suitable position in any of the other embodiments, wherever increased strength is desired.

In Fig. 7 there is illustrated an embodiment of the invention somewhat similar to that shown in Fig. 6 but employing an additional insulating layer of felt paper. In this figure, 71 represents the main body sheet of metal or the like, 72 is a layer of embossed paper, and 73 is a layer of adhesive. A layer 74 of felt paper or the like is interposed between the layer 72 and the main body sheet 71 and is affixed to the body sheet by an adhesive 75 such as asphaltum.

At times, insulation comprising these layers just described may be sufficient, but in other instances it is preferred to add to the insulating value of the product by providing a layer 76 affixed to the inner side of the embossed paper 72 by adhesive 77. This layer 76 may be of plain paper, or may be another sheet of felt paper similar to the layer 74, if desired. Indeed, if preferred, the layer 74 may be of plain paper and only the layer 76 of felt paper. Then a second layer 78 of embossed paper may be employed, affixed to the layer 76 by adhesive 79, and a final finishing sheet 80 may be secured to the layer 78 by adhesive 81. The finishing sheet 80 may conveniently be of plain paper or other suitable finishing material and it, as well as all of the other layers of sheets of paper in this or other embodiments, may be fire-proofed, water-proofed, or both fire-proofed and water-proofed in any desired manner.

In some instances, it may be desired to provide a firmer or stronger interior surface sheet on the insulating material, especially where this inner sheet is to form the exposed interior surface of the vehicle body. Sheets of plain paper, fabric or leather, such as 56 and 80, are sometimes satisfactory as interior surface sheets, yet it is ordinarily preferred to have the exposed interior sheet of substantial strength and rigidity, so that it will not become broken or damaged easily when articles come in contact with it as they would be apt to do in automobile trucks. Hence, according to the present invention, insulating material is provided having an interior surface of relatively hard and rigid material such as fiber board, preferably in the form of a relatively thick sheet or board such as a fiber wallboard. Fig. 3 illustrates a diagrammatic cross section through an automobile truck body having an outer layer 31 of metal or other suitable material, a layer 32 of embossed paper as previously described, and a layer 33 of tacky adhesive such as asphaltum to secure the layers 31 and 32 to each other. On the inner surface of the layer 32 there is a layer 34 of relatively hard and rigid material such as fiber wallboard, which may be secured to the embossed paper 32 by means of a layer 35 of suitable adhesive such as asphaltum. Such a layer 34 of fiber board forms a simple and satisfactory finished interior surface for bodies of light delivery trucks and other vehicles, and it may be applied directly to the frame members of the body, one of which is shown at 36 by way of illustration. The fiber board may be painted or otherwise decorated as desired.

In Fig. 2, there is shown an embodiment somewhat similar to that illustrated in Fig. 3, and having an outer layer 21 of metal or other suitable material and an inner layer 24 of hard rigid material such as fiber board. In this embodiment, however, the intermediate layer between the layers 21 and 24, instead of being of embossed paper, is a layer 23 of felt paper, secured to the layers 21 and 24 by layers 22 and 25 of suitable adhesive such as asphaltum. As before, the fiber board 24 may be applied directly to the frame member 26. If desired, the felt paper 23 may have a series of perforations 27 formed therein, it being found in practice that the provision of such perforations seems to provide a greater amount of sound damping or insulation than when such perforations are absent. Furthermore, the adhesive may extend somewhat into these perforations and thus lock the various layers more firmly together.

Fig. 1 illustrates diagrammatically the embodiment of Fig. 2 as applied to the body of a light delivery truck. Here the main outer sheet of the truck body is illustrated at 21, and it is partially broken away so as to show the layer 23 of felt paper and the perforations 27 therein. The felt paper in turn, is partially broken away to show the layer 24 of fiber board forming the interior surface of the body.

In the embodiment illustrated in Fig. 4 of the drawing, both the felt paper of Fig. 2 and embossed paper of Fig. 3 are employed. Here the outer body layer is indicated at 41, the felt paper at 42, the embossed paper at 43, and the layer of fiber board or the like at 44, these various layers being affixed to each other by suitable adhesive layers 45, 46 and 47. This entire structure may be applied to the outer surface of the frame member 48.

In actual use, the insulating constructions above described, especially when employing embossed paper as described, are found to be efficient and satisfactory in reducing noise and vibrations in vehicle bodies. The various layers of materials may be individually applied in building up the vehicle bodies, if desired, but it is ordinarily preferred to assemble the non-metallic layers with each other and then apply them bodily as a unit to the outer body layer 21 which is usually of sheet metal. The insulating material itself may be constructed or built up at the vehicle assembling plant, if desired, or it may be constructed elsewhere and shipped in rolls, sheets, or panels, to the assembling plant, where it is incorporated in the vehicle bodies.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A vehicle body construction including an outer body layer, characterized by a layer of felt paper and a layer of embossed paper on the inner side of said outer layer, and adhesive affixing said layers to each other and to said outer layer.

2. A vehicle body construction of the type including a layer of sheet metal, characterized by a layer of embossed paper adjacent the inner surface of said sheet metal, and a layer of asphaltum between said sheet metal and said embossed paper.

3. A laminated insulating material capable of being moderately bent for application to moderately curved metallic panels of vehicle bodies, said laminated material comprising a flexible layer of felt paper having perforations therein at intervals, a flexible layer of embossed paper, and a layer of tacky adhesive interposed between said two layers to affix them to each other.

4. Composite laminated material comprising a sheet of metal, a sheet of fiber board spaced from said metal sheet, and a sheet of soft embossed paper interposed between said metal sheet and said fiber board sheet and connected to them.

5. Composite laminated material comprising a sheet of metal, a sheet of fiber board spaced from said metal sheet, a sheet of soft embossed paper interposed between said metal sheet and said fiber board sheet, and a layer of tacky adhesive on each side of said sheet of embossed paper.

6. A vehicle body construction of the type including a layer of sheet metal, characterized by a layer of embossed paper adjacent the inner surface of said sheet metal, and a layer of tacky adhesive between said sheet metal and said embossed paper.

7. A vehicle body construction of the type including a layer of sheet metal, characterized by a layer of soft flexible fibrous material embossed at intervals throughout the major portion of its area, and adhesive securing said embossed fibrous material to said sheet metal body layer throughout a substantial area.

8. A vehicle body construction of the type including a layer of sheet metal, characterized by a sound damping layer in the form of a self-sustaining sheet of soft flexible fibrous material of substantial thickness embossed at relatively close intervals throughout substantially its entire area, said embossed sheet being applied to said sheet metal layer throughout a substantial area, and adhesive securing said embossed sheet firmly to said sheet metal layer.

CHARLES A. UPSON.